Aug. 11, 1953  C. A. WOODWARD  2,648,549
HOUSING FOR ELECTRICAL DEVICES AND THE LIKE
Filed March 4, 1949

INVENTOR:
CLEMENT A WOODWARD,
BY John Todd
ATTORNEY.

Patented Aug. 11, 1953

2,648,549

UNITED STATES PATENT OFFICE 2,648,549

HOUSING FOR ELECTRICAL DEVICES AND THE LIKE

Clement A. Woodward, Wellesley, Mass., assignor to United-Carr Fastener Corporation, Cambridge, Mass., a corporation of Massachusetts Application March 4, 1949, Serial No. 79,637

1 Claim. (Cl. 285—71)

This invention relates generally to a socket and hose assembly, and has particular reference to a socket member having a flexible hose assembled therewith for carrying electrical lead wires to a switch or other electrical device disposed in the socket.

The object of this invention is to provide a socket ond hose assembly in which a flexible hose is disposed through an opening in the socket and is secured therein by external and internal hose-engaging means to effect a water-tight seal therebetween.

A further object of the invention is to provide a socket and hose assembly in which a flexible hose disposed in an opening in the socket is maintained in waterproof engagement therewith by a hose-engaging eyelet disposed in the end of the hose in the socket.

Other objects of the invention will, in part, be obvious, and will, in part, appear hereinafter.

For a fuller understanding of the nature and objects of the invention, reference should be had to the following detailed description, taken in conjunction with the accompanying drawing, in which.

Figure 1:
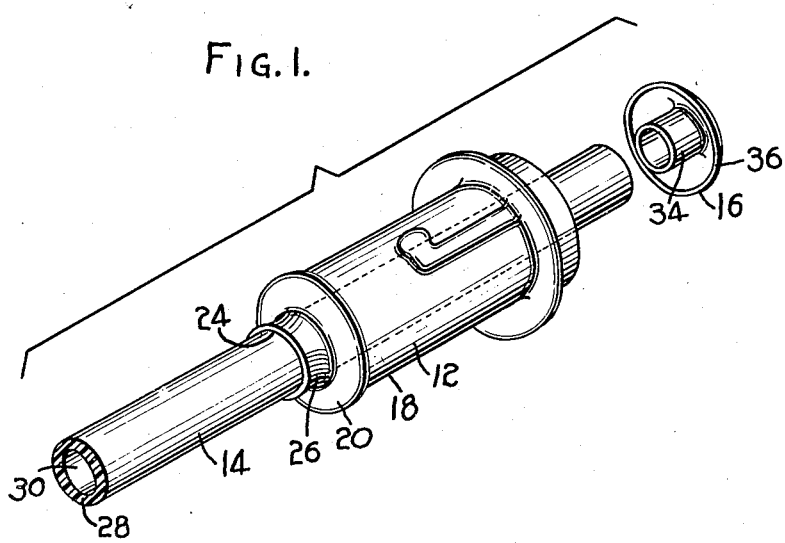
Fig. 1 is a perspective view of the component parts of the device.

Referring to the drawing, there is illustrated a socket and hose assembly 10, which comprises a socket member 12, which is adapted to contain an article such as a switch or other electrical device (not shown) and a flexible hose 14 assembled with the socket by means of an internal hose-retaining eyelet 16.

The socket 12 is preferably formed of sheet metal, and comprises a substantially cylindrical hollow body 18, having a base 20 at one end thereof, and a circumferential recess 22 disposed in the interior of the body adjacent the base. A hose-receiving opening 24 is provided in the base, and a collar 26 is disposed about the opening to engage the assembled tube or hose, as will be hereinafter described. The hose 14 comprises a wall 28 preferably formed of flexible material such as natural or synthetic rubber or plastic, and has an internal bore 30 to carry electrical lead wires (not shown) to the socket 12.

The hose-retaining eyelet 16 comprises a substantially cylindrical or tubular portion 34 adapted to be assembled in the end of the hose, and an outwardly extending flange 36 for engagement with the recess 22.

The end of the hose 14 is disposed in the socket opening 24, and in the preferred embodiment the wall 28 is turned outwardly inside the socket to form a flared end portion 32.

The tubular portion 34 of the eyelet extends into the bore 30 of the hose a sufficient distance to cooperate with the collar 26 to provide a water-tight seal therebetween. To effect such a seal, the internal diameter of the collar 26 and the external diameter of the tubular portion 34 of the eyelet must be in such relation to the thickness of the hose wall 28 as to cause substantial compression of the portion of the wall disposed therebetween when the device is assembled.

The flange 36 is shaped and arranged to confine the flared hose end 32 between the flange and the base 20, to assist in providing a water-tight and mechanically strong seal between the hose and the socket. To retain the eyelet in the assembled position, the outer periphery of the flange 36 is seated in the circumferential recess 22.

Figure 2:
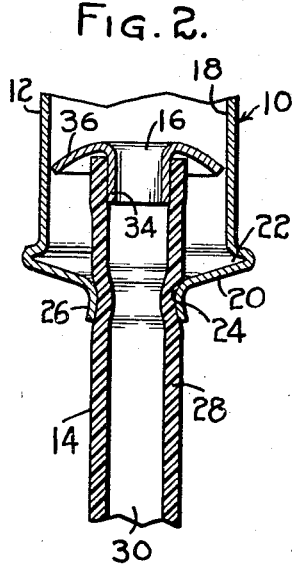
Fig. 2 is a view in elevation, partly in section, illustrating the method of arranging the component parts for final assembly.
Figure 3:
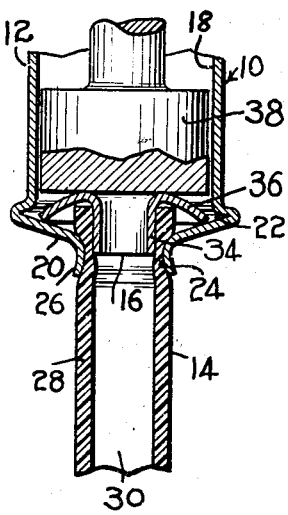
Fig. 3 is a view in elevation, partly in section, illustrating the final assembly operation.
Figure 4:
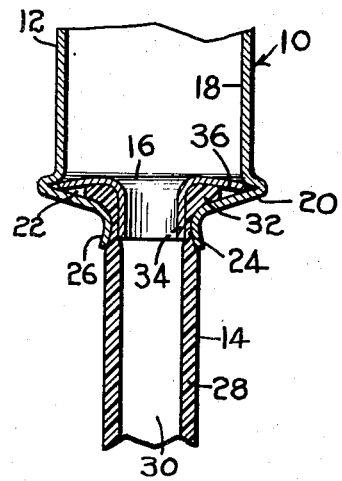
Fig. 4 is a view in elevation, partly in section, of the completely assembled device.

The method of assembly of the device is best illustrated by reference to Figs. 2 and 3. An end of the hose 14 is inserted through the opening 24, and the tubular portion 34 of the eyelet is inserted into the end of the hose. The flange 36 of the eyelet is initially bent inwardly to reduce the diameter and enable the eyelet to enter the body 18. The hose 14 is then pulled back through the opening 24 until the tubular portion 34 enters the opening 24. At this point, the wall 28 of the hose is compressed between the collar 28 and the tubular eyelet portion 34, which prevents further movement of the hose through the opening. To complete the assembly, a flat circular die 38 may then be pressed against the eyelet 16 inside the socket, to force the tubular portion 34 of the eyelet further into the bore of the hose, and to force the outer periphery of the flange 36 to engage the base 20 opposite the recess 22. Further pressure on the die causes the flange 36 to flatten, thereby increasing its diameter and forcing the outer periphery to seat in the recess 22. At the same time, the end of the hose wall 28 turns outwardly to become confined between the flange and the base.

Although I have illustrated and described preferred embodiments of my invention, I do not wish to be limited thereby as the scope of my invention is best defined in the appended claim.

I claim:

A waterproof housing and hose assembly comprising a substantially tubular housing member, a flexible hose having compressible walls, and a hose-retaining member, said housing member having an annular, angularly inwardly extending flange at one end and an axially outwardly extending collar on the radially inner edge of said flange defining an opening of less diameter than the outer diameter of said hose, said housing member at said one end including a grooved wall portion with an inwardly opening annular groove adjacent the radially outer periphery of said inwardly extending flange, said hose-retaining member comprising a relatively inelastic tubular portion having an outer diameter substantially equal to the inner diameter of said hose and an outwardly extending circumferential flange at one end of the tubular portion provided with housing-engaging edge portions at the outer periphery of said flange and normally having a bowed cross-section with the outer periphery normally disposed intermediate the ends of the tubular portion, said hose extending into said housing member through said collar, said hose-retaining member being disposed within said housing member with the tubular portion extending within the hose and compressing the walls thereof between the tubular portion and said collar, the end of said hose disposed within said housing member being flared outwardly into engagement with said flange of said housing member, and said outwardly extending flange being flattened into tensioned engagement in said groove.

CLEMENT A. WOODWARD.

References Cited in the file of this patent

UNITED STATES PATENTS

| Number | Name | Date |
|---|---|---|
| 299,720 | Barr | June 3, 1884 |
| 756,350 | Garbutt | Apr. 5, 1904 |
| 1,241,626 | Hachmann | Oct. 2, 1917 |
| 1,580,963 | Crandall | Apr. 13, 1926 |
| 1,919,860 | Reutter et al. | July 25, 1933 |
| 2,356,333 | Matter | Aug. 22, 1944 |
| 2,552,791 | Johnson | May 15, 1951 |